(12) United States Patent
Modrall

(10) Patent No.: US 7,716,340 B2
(45) Date of Patent: May 11, 2010

(54) RESTRICTING ACCESS TO A SHARED RESOURCE

(75) Inventor: Mark Modrall, Littleton, MA (US)

(73) Assignee: Lycos, Inc., Waltham, MA (US)

( * ) Notice: Subject to any disclaimer, the term of this patent is extended or adjusted under 35 U.S.C. 154(b) by 977 days.

(21) Appl. No.: 11/240,828

(22) Filed: Sep. 30, 2005

(65) Prior Publication Data

US 2007/0078983 A1 Apr. 5, 2007

(51) Int. Cl.
*G06F 15/16* (2006.01)
(52) U.S. Cl. .......................... 709/227; 709/219; 726/8
(58) Field of Classification Search ......... 709/223–229, 709/201–203
See application file for complete search history.

(56) References Cited

U.S. PATENT DOCUMENTS

| 6,453,353 | B1 * | 9/2002 | Win et al. | 709/229 |
| 7,299,294 | B1 * | 11/2007 | Bruck et al. | 709/235 |
| 2002/0199120 | A1 * | 12/2002 | Schmidt | 713/201 |
| 2003/0105976 | A1 * | 6/2003 | Copeland, III | 713/201 |
| 2004/0030931 | A1 * | 2/2004 | Chamandy et al. | 713/201 |

OTHER PUBLICATIONS (Osmar R. Zaïane, Buffer Management, http://www.cs.sfu.ca/CC/354/han/material/notes/354notes-chapter7/node11.html Oct. 31, 1995).*

* cited by examiner

*Primary Examiner*—Joseph E Avellino
*Assistant Examiner*—Afshawn Towfighi
(74) *Attorney, Agent, or Firm*—Fish & Richardson P.C.

(57) ABSTRACT

A method for restricting access of a client to a web site hosted at first and second servers is described. A first tally that includes identification information of the client and a first number of access requests sent from the client to the first server is received. A second tally that includes the identification information of the client and a second number of access requests sent from the client to the second server is received. The first and second tallies are collated to determine a total number of access requests made by the client.

16 Claims, 5 Drawing Sheets

34

```
Config file:
<?xml version="1.0" ?>
<CONFIG>
   <SETTINGS>
      <RELOAD_TIME>120</RELOAD_TIME>    ⎫
      <TOPN>5</TOPN>                     ⎬ 100
      <THRESHOLD>4</THRESHOLD>           ⎭
   </SETTINGS>

<ALLOW NAME="Allow 1">                ⎫
      <STANZA NAME="REMOTE_ADDR" TYPE="ip"> ⎬ 102
         <VALUE>255.255.255.20</VALUE>   ⎭
   </ALLOW>

<BLOCK HTTP_CODE="403" NAME="1st BLOCK">    ⎫
      <STANZA NAME="HTTP_USER_AGENT" TYPE="header">  ⎬ 104a
         <VALUE>go!zilla*</VALUE>                    ⎭
      </STANZA>
   </BLOCK>

<BLOCK HTTP_CODE="302" NAME="2nd BLOCK">
      <ADD_HEADER>
         <HEADER NAME="Location" VALUE="http://www.lycos.com/"/>
      </ADD_HEADER>                                       ⎬ 104b    ⎬ 104
      <STANZA NAME="HTTP_USER_AGENT">
         <VALUE>go!zilla (www.gozilla.com)</VALUE>
         <VALUE>checkbot/1.59 lwp/5.41</VALUE>
         <VALUE>cosmos/0.8_(robot@xyleme.com)</VALUE>
      </STANZA>
   </BLOCK>

<BLOCK NAME="3rd BLOCK">
      <STANZA NAME="HTTP_USER_AGENT">    ⎬ 104c
         <VALUE />
      </STANZA>
   </BLOCK>

<DYNAMIC_BLOCK>
      <REMOTE_ADDR VALUE="209.202.241.249">
         <SERVER IP="209.202.241.247" HITS="3"/>   ⎬ 106
         <SERVER IP="209.202.241.246" HITS="2"/>
      </REMOTE_ADDR>
   </DYNAMIC_BLOCK>
</CONFIG>
```

FIG. 4

RESTRICTING ACCESS TO A SHARED RESOURCE

TECHNICAL FIELD

This invention relates to detecting and blocking requests from programmatic robots.

BACKGROUND

A web site is a directory of files stored on a web server or several web servers that may be accessed by a client over a network (e.g., the Internet). Both individual users and non-human programmatic sources (referred to as "robots") may request access to a web server. Individual users who access a web server according to the intended presentation of the web site are referred to as "direct users". Direct users often purchase items or services from the web site and view advertisements and sponsorships displayed in the web site. For these reasons, and others, access to a web server by direct users is highly desirable. Direct users represent the primary source of revenue for companies that operate web sites.

Robots, on the other hand, retrieve and index documents contained within web sites and often deliver these documents elsewhere. Robots, which are also referred to as "spiders" or "web crawlers", may be server-based or client-based and are employed for a variety of reasons, some legitimate and many fraudulent. Robots can also be part of computer viruses, making the source of the activity difficult to track or control. Robots impose a cost on companies (both in terms of infrastructure to support the web site and whatever licensing costs are involved in presenting the content of a web page) while defeating most of the mechanisms by which a company attempts to make a profit.

Robots are often used by search engines to maintain an index of web sites. Legitimate robots follow conventions that allow web sites to mark pages, directories, or whole sites as "off limits"; pernicious robots ignore these conventions. There is a keen financial interest in minimizing access to a web server by pernicious robots.

SUMMARY

The present invention provides methods and systems, including computer program products, for restricting access of a client to a web site hosted at first and second servers.

In general, in one aspect, the invention features a method performed at a third server that includes receiving a first and second tallies associated with the client. The first tally includes identification information of the client and a first number of access requests sent from the client to the first server, and the second tally includes the identification information of the client and a second number of access requests sent from the client to the second server. The first and second tallies are collated to determine a total number of access requests made by the client.

Embodiments may include one or more of the following. A dynamic blocking instruction, an allow instruction, or a static blocking instruction may be assigned to the client's identification information. A dynamic blocking instruction causes the first and second servers to restrict access of the client to the web site. An allow instruction causes the first and second servers to always grant access to the client even if the total number of access requests exceeds the predefined threshold. A static blocking instruction causes the first and second servers to always deny access to the client even if the total number of access requests is below the predefined threshold. The dynamic blocking instruction, allow instruction, or static blocking instruction may be recorded in a configuration file which may then be sent to the first and second servers.

The first server performs functions that include: receiving the configuration file from the third server; receiving an access request from the client; recording, in a log entry, the client's identification information (e.g., internet protocol (IP) address) and information associated with the access request; determining whether the identification information of the client is associated with an instruction recorded in the configuration file; and if the identification information of the client is associated with an instruction recorded in the configuration file, controlling access to the first server from the client according to the instruction. Controlling client access, for example, may include denying the client access to the first server or granting the client access to the first server.

The first server may record, in a least-frequently-recently-used (LFRU) queue, a tally associated with the client and send the tally to the third server. Collating the first and second tallies may include adding the first number of requests to the second number of requests. The first number of requests may be subtracted from the total number of requests if no further tallies associated with the client are received from the first server within an expiration period and the first server may send a tally associated with the client if the client requests access to the first server. The dynamic blocking instruction may be deleted from the configuration file if the total number of access requests minus the first number of requests is below the predefined threshold.

In general, in another aspect, the invention features a system for restricting access to a web site hosted at first and second servers. The system includes a third server in communication with the first and second servers via a communications network. The third server includes: a collated database configured to collate tallies received from the first and second servers to obtain a total number of access requests made by a client to the first and second servers; an analysis engine configured to generate a dynamic blocking instruction that causes the first and second servers to deny access to the client if the total number of access requests exceeds a predefined threshold; and a configuration file including the dynamic blocking instruction. The tallies include identification information of the client and a number of access requests sent from the client to the first and second servers.

Embodiments may include one or more of the following. The first server may include: a local log file comprising identification information associated with the client and information associated with an access requests made by the client to the first server; a least-frequently-recently-used (LFRU) queue configured to store a tally associated with the client; and a blocking engine configured to block the client from accessing the first server according to the configurable blocking plan. The third server may further include a communication device for sending the configuration file to the first and second servers over the communications network.

Advantages that can be seen in particular implementations of the invention include one or more of the following. The total frequency of requests sent from a single IP address to a server farm can be determined even if the requests are spread over many servers in the server farm. A client is blocked from accessing the server farm for a configurable period of time if the number of requests sent from the client within a given time period exceeds a predefined threshold. The period over which a client is blocked extends as long as abusive traffic from that client continues plus a configurable margin. Furthermore, the configurable margin and the threshold of traffic considered abusive may be adjusted to reduce the likelihood of blocking legitimate client IP addresses that are shared among multiple users. Instructions for denying or allowing a client access to the server farm can be changed or updated periodically.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1b is a block diagram of an exemplary mid-tier server for use with the system of FIG. 1a.

FIG. 1c is a block diagram of an exemplary web server for use with the system of FIG. 1a.

FIG. 4 shows an exemplary configuration file.

DETAILED DESCRIPTION

Detecting and blocking requests from robots is difficult when the robots skillfully mimic real browser requests. Often the only indication that a robot, rather than a legitimate user, is requesting access to a web server is the frequency at which requests from the robot are made. If the frequency of access requests sent from an Internet protocol (IP) address exceeds an allowable frequency threshold, the server may mark the IP address as belonging to a robot and block further requests from the address. When a web site employs multiple servers (also referred to as a "server farm"), measuring the frequency of incoming requests for a particular IP address is difficult because the requests may be distributed among many different servers in the server farm. If the requests are spread out over multiple servers, the distribution of requests from a single IP address may or may not be even, making it difficult to set a threshold on a per-web server basis. In some situations, the total frequency of requests from a single IP address exceeds an allowable threshold; however, the frequency of requests to any given server in the server farm is lower than the threshold. By aggregating the requests made from a source to each server over the entire farm of servers, a complete set of request statistics for the source can be determined. The statistics may then be analyzed for indications of robot activity so that appropriate action can be taken.

Figure 1A:
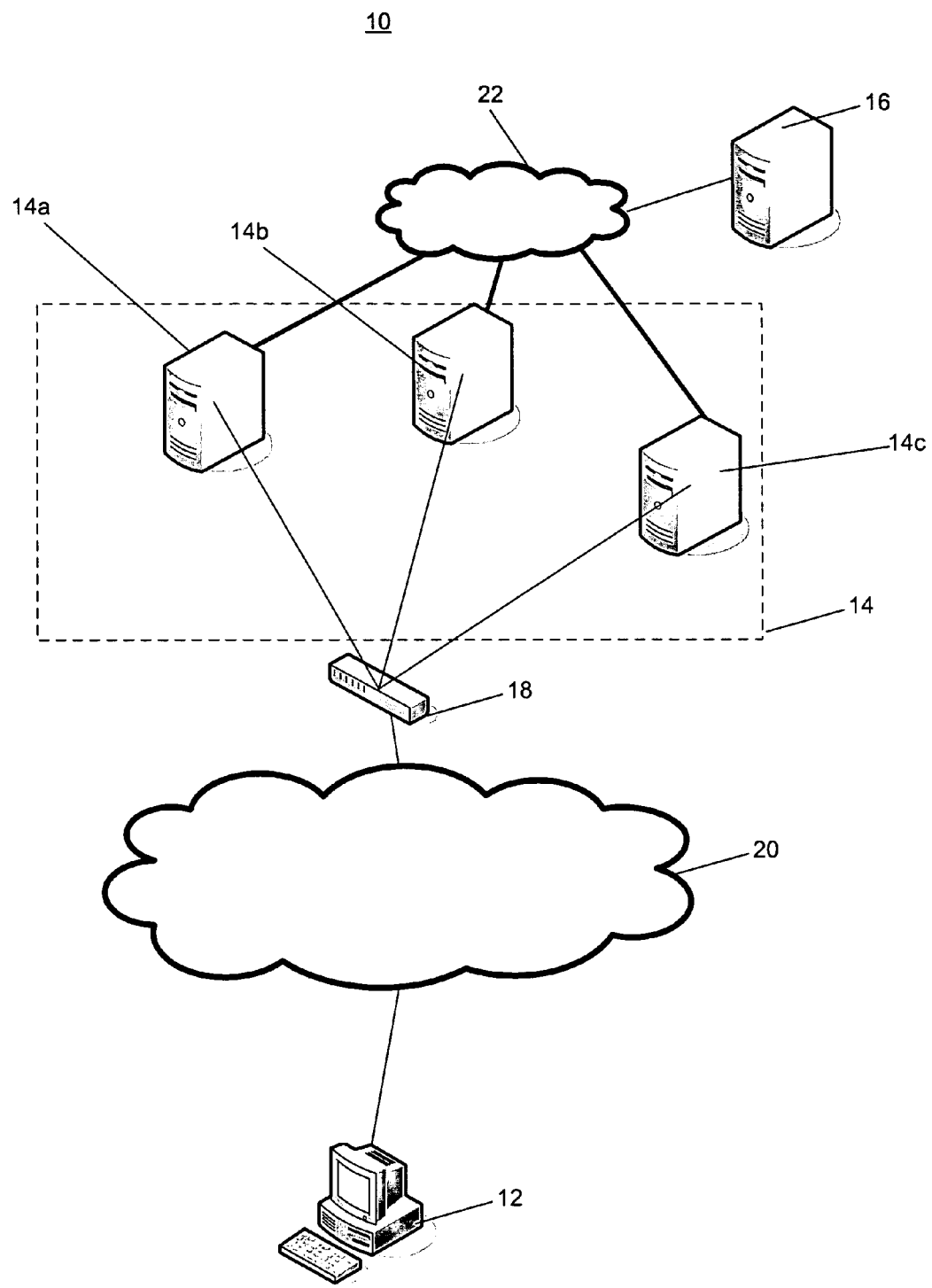
FIG. 1a is a block diagram of an exemplary system for dynamic robot traffic detection.
Figure 1B:
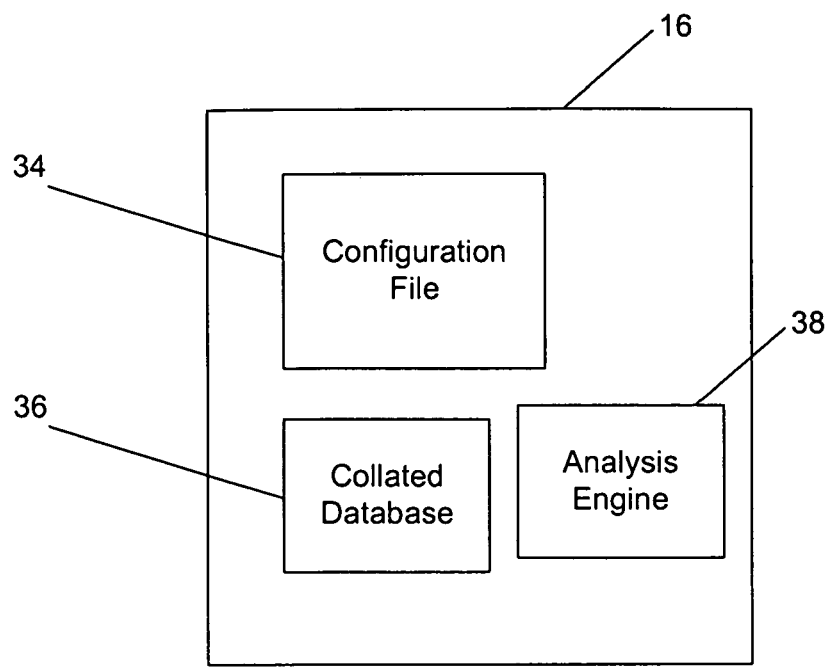
Figure 1C:
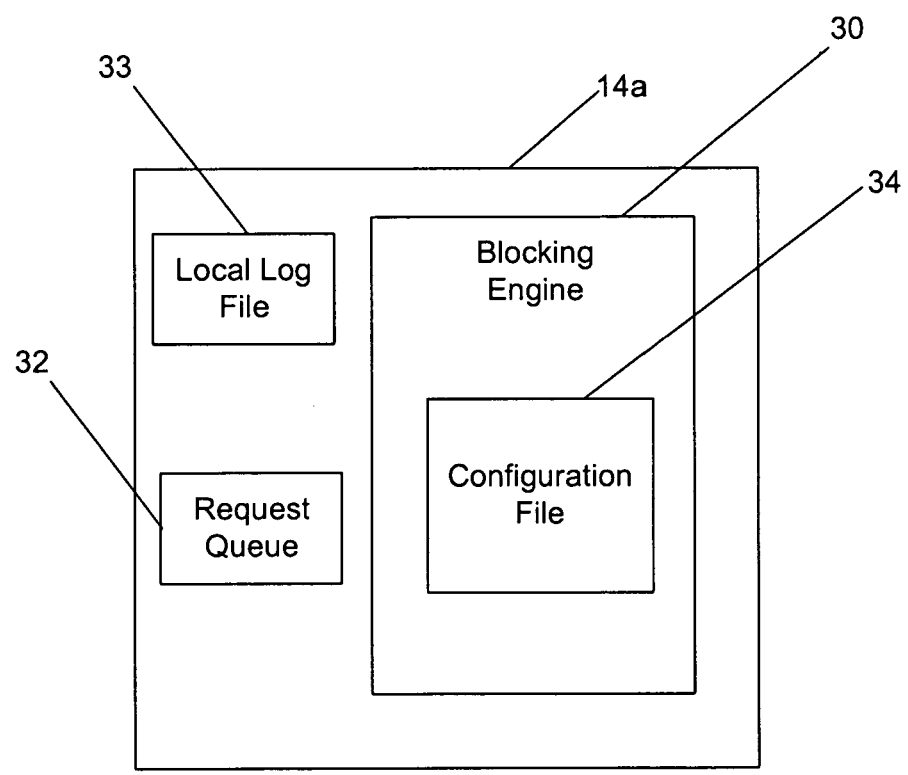

FIGS. 1a-1c illustrate an example of a system 10 for detecting and blocking requests from a robot. Client computer 12 requests and receives information from one or more of the servers 14a-c hosting a web site. Collectively, servers 14a-c are referred to as "server farm 14". In some embodiments, server farm 14 includes hundreds or thousands of servers. Client computer 12 and server farm 14 are connected to a network 20, which is the Internet. Client computer 12 may also be multiple client computers. In some embodiments, network 20 is a private network, a corporate intranet, or other similar wired or wireless network. Server farm 14 is also connected to network 22 through which communications are sent to and from mid-tier server 16. Mid-tier server 16 and servers 14a-c include communication devices for receiving and transmitting data over network 22. Network 22 is a private local area network that is separate from network 20. In some embodiments client 12 accesses server farm through an Internet service provider (ISP) that recycles temporary IP addresses among multiple clients including client 12. In other embodiments, client 12 has a permanent IP address.

In general, client 12 uses a Web browser program to interact with server farm 14 according to hypertext transfer protocol (HTTP). Examples of browsers include Internet Explorer® and Firefox®. In the browser, a user at client 12 enters a Universal Resource Locators (URL) for a desired web site. Users can also request pages by clicking on hyperlinks within a hypertext markup language (HTML) document. These requests are sent to one or more servers in the server farm 14. When a request is received at a server (e.g., server 14a), the server identifies the IP address from which the request originates. Each server in server farm 14 stores, in a request queue 32 (FIG. 1c), dynamic tallies of requests of clients that are most actively requesting access to server farm 14. A dynamic tally includes the number of requests sent by a client over a given period of time and the IP address of the client. Each of the servers 14a-c send their dynamic tallies to mid-tier server 16. In this way, only the most frequently requesting clients are reported to mid-tier server 16. Mid-tier server 16 collates the dynamic tallies sent from servers 14a-c and stores them in a collated database 36 (FIG. 1b).

As shown in FIG. 1b, mid-tier server 16 includes a collated database 36 of dynamic tallies sent from servers 14a-c, a configuration file 34, and an analysis engine 38. After receiving dynamic tallies from server farm 14, mid-tier server 16 collates the dynamic tallies and stores them in collated database 36. For example, if client 12 sends one request to each of servers 14a-c, each server sends a dynamic tally having a value of one to mid-tier server 16. Mid-tier server 16 collates the tallies in collated database 36, which records that client 12 made a total of three requests to the server farm 14. In some embodiments, collated database 36 includes hundreds or thousands of entries. Collated database 36 displays all of the requests distributed over server farm 14. The size of collated database 36 is not bounded, though it has some practical limits.

From the collated dynamic tallies associated with client 12, an analysis engine 38 calculates the total number of requests made from client 12 to the entire server farm 14 over a given period of time. Based on this total, the analysis engine 38 determines whether to block further access requests from client 12 or to flag the client's IP address to an operator's attention. If a decision is made to block client 12, the client's fingerprint information (e.g., IP address) is associated with a blocking instruction. The client's fingerprint information and associated blocking instruction are recorded in the configuration file 34.

Configuration file 34 includes a list of client fingerprints to be blocked. In some embodiments, configuration file 34 includes a list of client IP addresses that are permanently blocked. Such a list is referred to as a "black list". In other embodiments, configuration file 34 includes a list of client IP addresses from which requests are always allowed. Such a list is referred to as a "white list". The IP addresses and other client information contained in a white list could, for example, belong to client machines that frequently access server farm 14 for legitimate purposes (e.g., server maintenance and configuration). Configuration file 34 also includes a list of client IP addresses to be blocked temporarily. Such a list is referred to as a "dynamic block list". After analysis engine 38 updates the configuration file 34, mid-tier server 16 sends the configuration file 34 to each of the servers 14a-c in server farm 14 over network 22.

The period of time over which an IP address listed in the dynamic block list is denied access to server farm 14 depend on the last time each server of server farm 14 received requests from that IP address. After receiving a request from the IP address, if a server (e.g., server 14a) does not receive anymore requests from the IP address within a certain period of time (referred to as an expiration period), the number of requests from IP address that were previously reported by the server is subtracted from the total number of requests recorded for IP address in collated database 36. For example, if servers 14a reports 100 requests sent from client 12, server 14b reports 40 requests sent from client 12, and server 14c reports 25 requests sent from client 12 in a given time period, the total number of requests sent from client 12 to server farm 14 is 165. If in the next time period, for example, server 14a reports another 27 requests sent from client 12, server 14b reports 13 more requests sent from client 12, and server 14c reports 10 more requests sent from client 12, the overall total becomes 215. The collated database 36 arrives at this total by keeping track of the subtotals for each server 14a-c and adding these subtotals. In the previous example, the subtotals for servers 14a, 14b, and 14c after the second time period are 127, 53, and 35 requests, respectively. If, for example, client 12 makes no more requests to server 14c within the expiration period—even if it still sends requests to servers 14a and 14b—the subtotal of previous requests sent to server 14c from the client (i.e., 35) is subtracted from the total while new contributions from servers 14a and 14b still accumulate. When the entries for servers 14a-c all expire for a given client IP address, the entire record for that client is removed from collated database 36.

Referring to FIG. 1c, a block diagram of one of the servers (i.e., server 14a) in server farm 14 is shown. The block diagrams for servers 14b and 14c are analogous to that of server 14a. Server 14a includes a blocking engine 30, a request queue 32, and a local log file 33. After server 14a receives an access request from client 12, server 14a either creates a new entry for client 12 in request queue 32 or updates an existing entry for client 12 in request queue 32.

Request queue 32 has a fixed size and is therefore limited in how many IP addresses it can record. Request queue 32 deletes existing entries of clients based on both the frequency of requests made by the clients to server 14a and the amount of time that passes before the clients send requests to server 14a. This type of deletion scheme is referred to as a least-recently-frequently used (LRFU) deletion scheme. For example, the collated log file 36 may delete an entry for client 12 if client 12 fails to make a request within a certain time period (e.g. thirty minutes) and if the tally of requests recorded for client 12 is below a given threshold (e.g., five requests). Request queue 32 applies the LRFU queuing mechanism so that the most active clients (i.e., the clients making the most requests over a given time period) filter to the top of request queue 32. The most active clients are of the most interest as they are the most indicative of suspicious behavior. In aggregating the dynamic tallies from the request queues of all the servers in server farm 14, mid-tier server 16 makes the larger determination of which clients are engaged in wholesale pernicious activity.

Server 14a also stores a local log file 33 that logs client requests. Local log file 33 is separate from request queue 32. In general, local log file 33 stores more information about client requests than request queue 32. Local log file records a client's identification information (referred to as a "client fingerprint") along with information that is specific to the client's request. A client fingerprint, for example, may include a client IP address and a user agent string. Information that is specific to the client's request may include the web browser from which a request is made, the web page that is being requesting, the page from which the requests originated, the time and date of the requests, the client ip address, and the "cookies" the client presented with the request.

Blocking engine 30 determines whether or not to block client 12 from accessing server 14a based on the information contained in configuration file 34. After server 14a receives a request from a client, the fingerprint of the client is recorded in local log file 33. Blocking engine 30 determines whether any information in the client fingerprint is contained in the configuration file 34. If a match is found, blocking engine 30 determines whether an allow instruction or a blocking instruction is assigned to the client fingerprint. If blocking engine 30 matches any information in the client fingerprint to a blocking instruction, blocking engine 30 blocks the client from accessing server 14a. If specified in the blocking instruction, blocking engine 30 may also send a message back to the client (e.g., an HTTP 403 "Permission Denied" message) or redirect the client to another web page.

Figure 2:
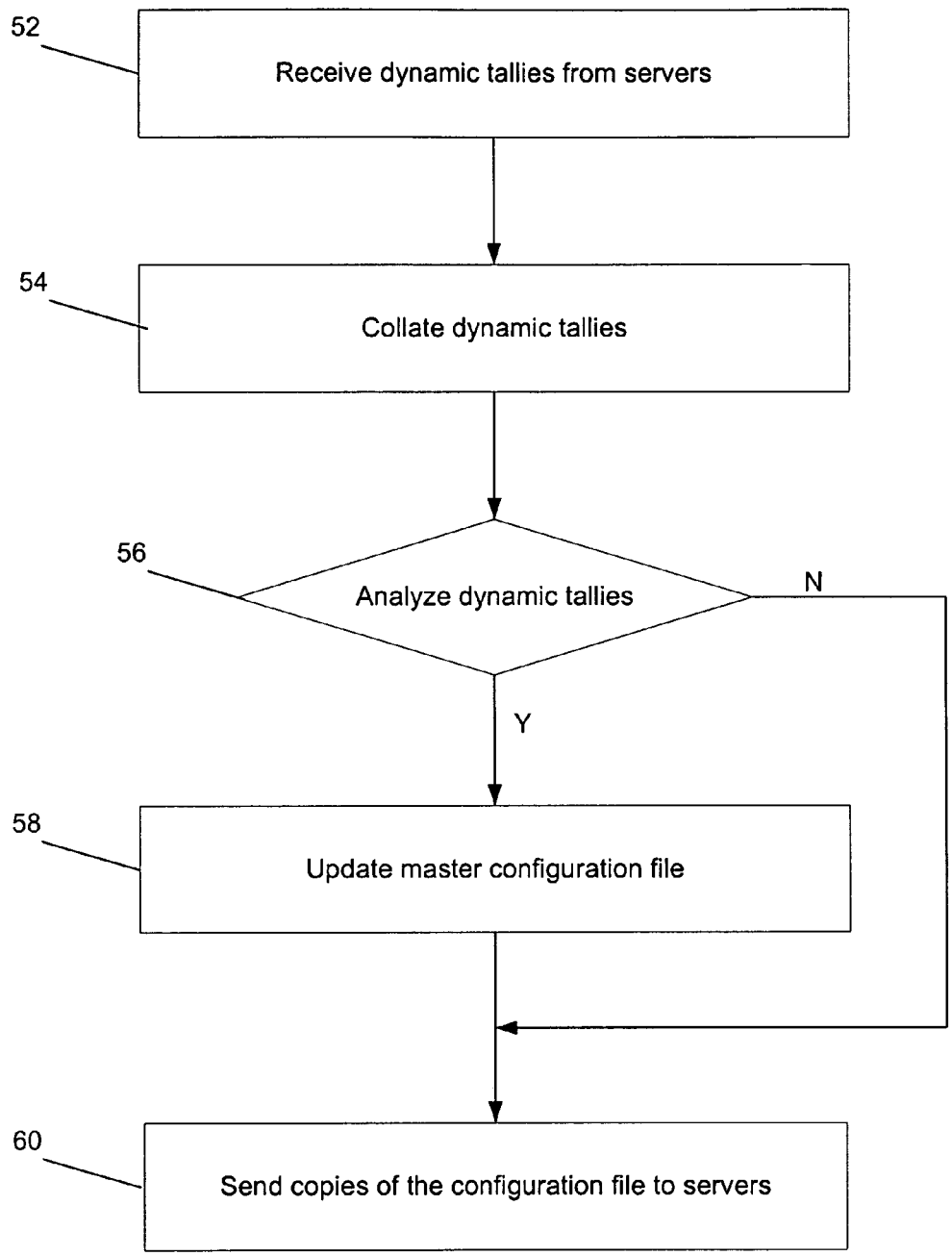
FIG. 2 is a flowchart of an exemplary procedure for updating a configuration file.

Referring to FIG. 2, a process 50 for updating configuration file 34 is performed at mid-tier server 16. Mid-tier server 16 receives (52) dynamic tallies from server farm 14. The dynamic tallies include the IP addresses of clients requesting access to the server farm 14 and the number of requests sent from each IP address. In some embodiments, the dynamic tallies are sent to mid-tier server 16 at scheduled times (e.g., 12:00 AM, 1:35 AM, 3:30 AM, etc.). In other embodiments, the dynamic tallies entries are sent to mid-tier server 16 at delta time intervals (e.g., every ten minutes). Mid-tier server 16 then collates (54) the log entries and records them in collated database 36. Collated database 36 shows all of the requests sent from a particular IP address to various servers in server farm 14.

Analysis engine 38 analyzes (56) the collated dynamic tallies in collated database 36 to determine which, if any, IP addresses should be blocked from accessing server farm 14 or flagged to an operator's attention. From the collated dynamic tallies, the analysis engine 38 calculates the total number of requests made from each client over a given time period. Based on the frequency of requests calculated for a client, the analysis engine 38 determines whether to block further access requests from the client's IP address or to flag the client's IP address to an operator's attention. Analysis engine 38 decides to block an IP address, if within a given time period, the total frequency of requests originating from the IP address exceeds a predefined threshold. If a decision is made to block a client, the analysis engine 38 assigns a blocking instruction to the client's fingerprint information (e.g., IP address). After receiving a request, if server 14a does not receive anymore requests from the IP address within an expiration period, the subtotal of requests from the IP address that were reported by server 14a is subtracted from the total number of requests that is recorded for the IP address in collated database 36. As long as the net of new requests from the client IP address to any of the servers less the count of requests that expire continues to be above the threshold, the analysis engine 38 maintains a block instruction on the client IP address. If the total number of requests recorded for the IP address falls below the threshold, analysis engine 38 deletes the blocking instruction assigned to the IP address from configuration file 34. Therefore, the next time server 14a downloads configuration file 34, server 14a will grant access to the client IP address.

Because some client IP addresses may be cycled or shared between different users (e.g., through an Internet Service Provider), there is a chance that a legitimate user could acquire a blocked IP address that was previously assigned to a malicious user. Thus, the predefined threshold and/or the time period over which requests are recorded and reported to mid-tier server 16 may be adjusted to reduce the likelihood of blocking legitimate users with recycled IP addresses.

In some embodiments, the analysis procedure (56) determines that a client should be permanently blocked from accessing server farm 14. In other embodiments, configuration file 34 includes blocking instructions that are only executed if particular information is absent from a client's fingerprint. For example, access may be denied to clients whose client fingerprints are missing a user-agent string value.

Analysis engine 38 stores (58) the client IP address and associated blocking instructions in configuration file 34. After configuration file 34 has been updated (58), mid-tier server 16 sends (60) a copy of configuration file 34 to each of the servers 14*a-c* in server farm 14. In some embodiments, the mid-tier server 16 sends configuration file 34 to server farm 14 at scheduled times (e.g., 12:00 AM, 1:35 AM, 3:30 AM, etc.). In other embodiments, configuration file 34 is sent at delta time intervals (e.g., every ten minutes). Delta time intervals are relative to the last (or first) time that a front end server performed a given task. As each of the servers 14*a-c* can be rebooted or restarted independently, each machine could be performing these operations at different times with delta time configuration. In some embodiments, the configuration file 34 is manually updated by an operator accessing mid-tier server 16 either directly or remotely over network 22.

Figure 3:
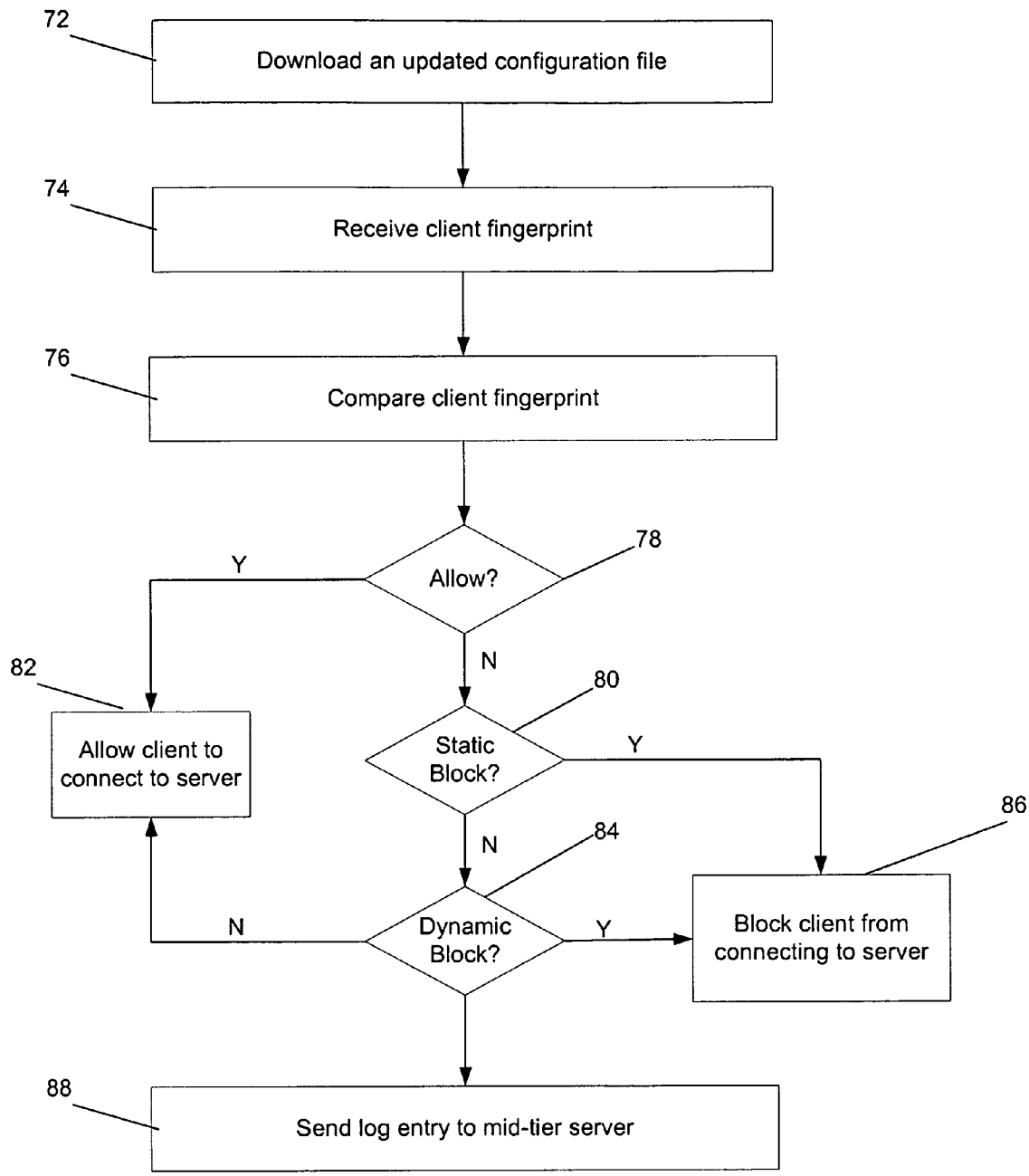
FIG. 3 is a flowchart of an exemplary blocking procedure.

Referring to FIG. 3, a process 70 for identifying and blocking robots is performed at each of the servers 14*a-c*. For ease of explanation, process 70 is described with respect to server 14*a*. Server 14*a* downloads (72) configuration file 34 from mid-tier server 16 and saves it in a data storage device. Older versions of configuration file 34 stored in server 14*a* are replaced by the new configuration file 34 that is downloaded (72) from mid-tier server 16. After receiving (74) an access request from client 12, server 14*a* updates request queue 32 and generates a new log entry for client 12 in local log file 33. The log entry includes the client's fingerprint and information that is specific to the client's request (e.g., the web page that is being requesting). After a predetermined time, server 14*a* sends (88) the dynamic tallies stored in request queue 32 to mid-tier server 16. In some embodiments, server 14*a* sends the dynamic tallies to mid-tier server 16 at scheduled times (e.g., 12:00 AM, 1:35 AM, 3:30 AM, etc.). In other embodiments, the dynamic tallies are sent at finite delta time intervals (e.g., every ten minutes). As each of the front end servers 14*a-c* can be rebooted or restarted independently, each of the servers 14*a-c* could be sending dynamic tallies at different times with the delta time configuration.

Blocking engine 30 compares (76) the client fingerprint stored in local log file 33 to the information stored in configuration file 34 to determine whether any information in the client fingerprint is contained in the configuration file 34. Blocking engine 30 determines (78) whether the configuration file 34 includes an instruction for allowing client 12 to connect to server 14*a*. In some embodiments, blocking engine 30 compares the client's fingerprint to a white list of client fingerprint information. If blocking engine 30 determines (78) that the configuration file 34 includes an instruction for allowing client 12 to connect to server 14*a* (e.g., the client's fingerprint matches an entry in the white list), client 12 is allowed (82) to connect to server 14*a*.

If blocking engine 30 does not find an instruction for allowing client 12 to connect to server 14*a*, blocking engine 30 determines (80) whether configuration file 34 includes a static blocking instruction for permanently blocking the client from accessing server 14*a*. In some embodiments, blocking engine 30 compares the client's fingerprint information to a black list of client fingerprint information. If blocking engine 30 determines (80) that the configuration file 34 includes a static blocking instruction for permanently blocking the client from server 14*a* (e.g., the client's fingerprint matches an entry in the black list), blocking engine 30 blocks (86) client 12 from accessing server 14*a* and sends a message (e.g., a HTTP 403 "Permission Denied" message) to client 12. In some embodiments, a static blocking instruction is based on information included in the local log file 33. For example, a static block instruction may instruct blocking engine 30 to deny access to a client if the client's web browser is known to be that of a robot (or if the client's web browser is unknown).

If blocking engine 30 does not find a static blocking instruction associated with the client fingerprint, blocking engine 30 determines (84) whether configuration file 34 includes a dynamic blocking instruction for temporarily blocking client 12 from accessing server 14*a*. If blocking engine 30 determines (84) that the configuration file 34 includes a dynamic blocking instruction associated with the IP address of client 12, blocking engine 30 blocks (86) client 12 from accessing server 14*a* and sends a message (e.g., a HTTP 403 "Permission Denied" message) to client 12. Blocking engine 30 will continue to block client 12 from accessing server 14*a* so long as the total dynamic tally of requests made to server farm 14 from client 12 exceeds a threshold. Likewise, the blocking engines in servers 14*b-c*, will block client 12 from accessing server 14*a* so long as the total dynamic tally of requests made to server farm 14 from client 12 exceeds the threshold. If server 14*a* does not receive any more requests from client 12 within an expiration period, the subtotal of requests from client 12 that were reported by server 14*a* is subtracted from the total number of requests that is recorded for client 12 in collated database 36. As long as the net of new requests from client 12 to any of the servers less the count of requests that expire continues to be above the threshold, the analysis engine 38 maintains the block instruction on the IP address of client 12. If the total tally of requests recorded for client 12 falls below the threshold, analysis engine 38 will delete the blocking instruction assigned to the IP address of client 12 when it updates (58) (FIG. 2) configuration file 34. Therefore, the next time servers 14*a-c* download configuration file 34, client 12 will be granted access to server farm 14. If blocking engine 30 does not find a dynamic blocking instruction associated with the client fingerprint in configuration file 34, blocking engine 30 allows (82) client 12 to connect to server 14*a*.

Referring to FIG. 4, an exemplary configuration file 34 is shown. Configuration file 34 is expressed in extended markup language (XML). Configuration file 34 includes SETTINGS instructions 100, ALLOW instructions 102, static BLOCK instructions 104, and DYNAMIC BLOCK instructions 106. The SETTINGS instructions 100 are parsed each time blocking engine 30 reloads configuration file 34. A RELOAD_TIME attribute indicates the time for blocking engine 30 to reload configuration file 34. In the example shown in FIG. 4, blocking engine 30 reloads configuration file 34 at delta time intervals of 120 seconds. In some embodiments, blocking engine 30 reloads configuration file 34 at scheduled times (e.g., 12:00 AM, 1:35 AM, 3:30 AM, etc.). To accomplish this, the RELOAD_TIME may include a scheduling command, such as the crontab command found in Unix and other similar operating systems.

In some embodiments, the SETTINGS instructions 100 include a DYNAMIC_TIME attribute that indicates a time for blocking engine 30 to upload dynamic tallies of request queue 32 if dynamic blocking is turned on. As described above, request queue 32 stores dynamic tallies of clients that are most actively requesting access to server farm 14. In some embodiments, blocking engine 30 uploads the dynamic tallies from the server farm 14 at delta time intervals (e.g., every 3000 seconds). In other embodiments, blocking engine 30 uploads the dynamic tallies at scheduled times (e.g., 12:00 AM, 1:35 AM, 3:30 AM, etc.). For scheduling reloads at precise times, the DYNAMIC_TIME attribute may include a scheduling command, such as the crontab command found in Unix and other similar operating systems. In some embodiments, if dynamic blocking is being employed, both the RELOAD_TIME and the DYNAMIC_TIME attributes are defined with crontab syntax with the times staggered slightly. Scheduling the reloading of configuration file 34 and the uploading of the tallies in this way provides a consistent state of the dynamic data. On the other hand, scheduling the reloading and uploading at delta time interval may cause the loading of configuration file 34 and the dynamic blocking operations to be out of synch and possibly collide.

The TOPN attribute is the number of suspect IP addresses that are being monitored. In the example shown in FIG. 4, TOPN has a value of five, meaning the five most active client IP addresses are being monitored at a given time. In some embodiments, assigning TOPN a value of zero turns off dynamic blocking. If TOPN is negative, it indicates that the dynamic usage information is to be gathered but not used to reject requests. The entries tracked in request queue 32 may be recorded and analyzed at a later time. In some embodiments, to better detect hard-hitting bots quickly and reduce the likelihood of blocking legitimate users with recycled IP addresses, request queue 32 retains between approximately one-hundred and two-hundred entries, configuration file 34 is updated every ten minutes, and suspicious IP address are blocked for no more than two hours. In these embodiments, robots are detected every ten minutes and blocked yet the robot's IP address is blocked temporarily in case the robot's IP address is later assigned to a legitimate user.

The THRESHOLD attribute is the number of access requests that are allowed from client 12. If the total number of access requests from client 12 exceeds the THRESHOLD, client 12 is blocked from connecting to server 14a. In the example shown in FIG. 4, the THRESHOLD is set to four. In some embodiments the THRESHOLD could be on the order of ten to one-thousand.

In some embodiments, the SETTINGS instructions 100 include a LOCAL_THRESHOLD attribute that indicates the number of requests allowed from a client to a specific server in a server farm. If the total number of requests from client 12 to the specified server exceeds the LOCAL_THRESHOLD, client 12 is blocked until its IP address rotates out of request queue 32.

In some embodiments, the SETTINGS instructions 100 include a REPORTING_THRESHOLD attribute that indicates the number of requests from client 12 to server 14a that must be reached before the dynamic tally recorded in request queue 32 for a particular client is sent to mid-tier server 16. Aggregating only the dynamic tallies above REPORTING_THRESHOLD reduces the amount of statistical noise of single requests in the dynamic blocking data. In some embodiments, the REPORTING_THRESHOLD attribute has a default value of two.

The configuration file 34 includes ALLOW instructions 102 for granting access to the server. The ALLOW instructions 102 are applied before static BLOCK instructions 104 and before DYNAMIC_BLOCK instructions 106. The ALLOW instructions 102 include NAME attributes and STANZA elements. A NAME attribute includes a name assigned to an ALLOW instruction 102 and a STANZA element includes a set of matching values associated with the ALLOW instruction 102. The ALLOW instruction 102 shown in FIG. 4 grants access to client 12 if the client's fingerprint contains an IP address of 255.255.255.20. In some embodiments, a diagnostic log records the number of times that the ALLOW instruction 102 allows client 12 to connect to the server.

Configuration file 34 includes static BLOCK instructions 104 for permanently blocking access to server farm 14. Static BLOCK instructions 104 are executed after ALLOW instructions 102 and before DYNAMIC_BLOCK instructions 106. Static BLOCK instructions 104 include HTTP_CODE and NAME attributes, and STANZA and ADD_HEADER elements. An HTTP_CODE attribute specifies the HTTP code sent back to client 12 if client 12 is blocked. Examples of HTTP code include code numbers "301", "302" (which indicate the client should be redirected to another page), or "403" (which explicitly denies the request). A NAME attribute includes a name assigned to a static BLOCK instruction 104 and a STANZA element includes a set of matching values associated with the static BLOCK instruction 104. The ADD_HEADER element includes a response header that can be sent back to client 12. Examples of BLOCK instructions 104 are shown in FIG. 4.

The first static BLOCK instruction 104a shown in FIG. 4 is given the name "1st BLOCK". The static BLOCK instruction 104a instructs blocking engine 30 to block clients whose fingerprints contain the user-agent string (i.e., HTTP_USER_AGENT) that starts with "go!zilla". When client 12 is blocked by static BLOCK instruction 104a, blocking engine 30 sends a "304" (the value of HTTP_CODE attribute) to client 12. A second static BLOCK instruction 104b is called "2nd BLOCK". Static BLOCK instruction 104b blocks clients whose fingerprints match any one of the user-agent strings: "go!zilla (www.gozilla.com)", "checkbot/1.59 lwp/5.41", and "cosmos/0.8_(robot@xyleme.com)". When client 12 is blocked by static BLOCK instruction 104b, blocking engine 30 sends a "302" message (i.e., the value of HTTP_CODE attribute) and a "Location: http://www.lycos.com/" message (i.e., the values of the NAME attribute and VALUE attributes) back to client 12. A third BLOCK instruction 104c (i.e., "3rd BLOCK") instructs blocking engine 30 to block clients whose fingerprints contain undefined or empty user-agent strings.

Configuration file 34 includes DYNAMIC BLOCK instructions 106 for blocking access to the server. DYNAMIC_BLOCK instructions 106 are executed after ALLOW instructions 102 and static BLOCK instructions 104 are executed. DYNAMIC_BLOCK instructions 106 may include DYNAMIC_HEADERS elements that define the action to be taken when requests are to be blocked by dynamic blocking. DYNAMIC_HEADERS elements include HTTP_CODE and ADD_HEADER attributes such as those described for static BLOCK instructions 104. DYNAMIC_BLOCK instructions 106 include STANZA elements that specify the conditions under which clients are dynamically blocked. A NAME attribute of a STANZA element specifies which information in the local log entries are to be applied to a particular DYNAMIC BLOCK instruction 106. Table 1 lists examples of NAME attributes.

TABLE 1

| NAME | Description |
| --- | --- |
| REMOTE_ADDR | IP address of the client |
| REMOTE_HOST | Hostname of the client |

TABLE 1-continued

| NAME | Description |
| --- | --- |
| REMOTE_USER | Username supplied by the client and authenticated by the server |
| SERVER_NAME | Server's hostname (or IP address) as it should appear in self-referencing URLs |
| SERVER_PORT | TCP/IP port on which the request was received |
| SERVER_PROTOCOL | Name and version of the information retrieval protocol relating to a request |
| SERVER_SOFTWARE | Name and version of the web server under which the CGI program is running |

STANZA elements include VALUE child elements that specify the value of an attribute. VALUEs can include the wildcard pattern matching characters "?" and "*". STANZA elements may include UNDEFINED child elements that are matched to local log entries in which no specified header is defined. STANZA elements may also include FUNCTION attributes that determine the function that the blocking engine 30 uses to resolve a NAME attribute.

Examples of DYNAMIC BLOCK instructions 106 are shown in FIG. 4. A REMOTE_ADDR attribute is assigned a VALUE of a suspicious IP address, i.e., "209.202.241.249". The SERVER/IP attribute denotes the IP address of a server in server farm 14 and the SERVER/HITS attribute represents the number of HITS (i.e., access requests) that a particular server has received from the suspected IP address. In this example, a client at IP address "209.202.241.249" has made three access requests to a server at IP address "209.202.241.247" and two access requests to a server at IP address "209.202.241.246". Thus, the client has sent a total number of five access requests to the server farm. Because the total number of access requests (i.e, five) is greater than the THRESHOLD (i.e., four), the IP address "209.202.241.249" is blocked from accessing server farm 14.

Processes 50 and 70 can be implemented in digital electronic circuitry, or in computer hardware, firmware, software, or in combinations of them. Processes 50 and 70 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processes 50 and 70 can be performed by one or more programmable processors executing a computer program to perform functions of the invention by operating on input data and generating an output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments have been described. Nevertheless, it will be understood that various modifications may be made. For example, the procedures of processes 50 and 70 may be performed in different orders than are shown in FIGS. 2 and 3. Furthermore, some of the procedures of processes 50 and 70, e.g., receiving procedure (74) of process 70, may be performed multiple times in repetition. Accordingly, these and other embodiments are within the scope of the following claims.

What is claimed is:

1. A method, performed at a third server, for restricting access of a client to a web site hosted at a first server and a second server, the first server differing from the second server, the method comprising:

receiving, from the first server, a first tally associated with the client, the first tally comprising identification information of the client and a first number of access requests sent from the client to the first server;

receiving, from the second server, a second tally associated with the client, the second tally comprising the identification information of the client and a second number of access requests sent from the client to the second server;

collating, in a database, the first and second tallies based on the identification information of the client associated with the first and second tallies;

calculating, based on the collated first and second tallies, a total number of access requests made by the client over a specified period of time;

assigning a dynamic blocking instruction to the identification information of the client if the total number of access requests over the specified period of time exceeds a predefined threshold, the dynamic blocking instruction being stored in a configuration file and the dynamic blocking instruction for causing the first and second servers to restrict access of the client to the web site; and subtracting the first number of requests from the total number of requests if no further tallies associated with the client are received from the first server within an expiration period, the first server sending a tally associated with the client if the client requests access to the first server.

2. The method of claim 1, further comprising:

sending the configuration file to the first and second servers, the first and second services using the dynamic blocking instruction to restrict the access of the client to the web site.

3. The method of claim 1, further comprising, at the first server:

storing the configuration file received from the third server;

receiving an access request from the client;

recording, in a log entry, identification information associated with the client and information associated with the access request, wherein the identification information comprises an internet protocol (IP) address;

determining whether the identification information of the client is associated with an instruction recorded in the configuration file; and if the identification information of the client is associated with an instruction recorded in the configuration file, controlling access to the first server from the client according to the instruction.

4. The method of claim 3, wherein controlling access to the first server comprises denying the client access to the first server.

5. The method of claim 3, wherein controlling access to the first server comprises granting the client access to the first server.

6. The method of claim 3, further comprising, at the first server:

recording, in a least-frequently-recently used (LFRU) queue, a third tally associated with the client, the tally comprising identification information of the client and a number of access requests sent from the client to the first server; and sending the third tally to the third server.

7. The method of claim 1, further comprising assigning an allow instruction to the identification information of the client, the allow instruction causing the first and second servers to always grant access to the client even if the total number of access requests exceeds a predefined threshold.

8. The method of claim 1, further comprising assigning a static blocking instruction to the identification information of the client, the static blocking instruction causing the first and second servers to always deny access to the client even if the total number of access requests is below a predefined threshold.

9. The method of claim 1, wherein calculating the total number of access requests comprises adding the first number of requests to the second number of requests.

10. The method of claim 1, further comprising:

deleting the dynamic blocking instruction from the configuration file if the total number of access requests minus the first number of requests is below the predefined threshold; and sending the configuration file to the first and second servers.

11. A computer-based system for restricting access to a web site hosted at a first server and a second server, the first server differing from the second server, the system comprising:

a third server in communication with the first and second servers via a communications network, the third server comprising:

a collated database configured to collate tallies associated with the client and received from the first and second servers, the tallies comprising identification information of the client and a number of access requests sent from the client to the first and second servers;

an first analysis engine configured to calculate, based on the collated first and second tallies, a total number of access requests made by the client over a specified period of time and generate a dynamic blocking instruction that causes the first and second servers to deny access to the client if the total number of access requests exceeds a predefined threshold;

a second analysis engine configured to subtract a first number of requests, sent from the client to the first server, from the total number of requests if no further tallies associated with the client are received from the first server within an expiration period; and a configuration file comprising the dynamic blocking instruction.

12. The system of claim 11, wherein the first server comprises:

a local log file comprising identification information associated with the client and information associated with an access requests made by the client to the first server;

a least-frequently-recently-used (LFRU) queue configured to store a tally associated with the client, the tally comprising an IP address of the client and a number of access requests sent from the client to the first server; and a blocking engine configured to block the client from accessing the first server according to the dynamic blocking instruction.

13. The system of claim 11, wherein the third server further comprises a communication device for sending the configuration file to the first and second servers over the communications network.

14. A computer program product for restricting access of a client to a web site hosted at a first server and a second server, the first server differing from the second server, the computer program product being tangibly embodied in a non-transitory computer-readable medium, the computer program product comprising instructions that cause one or more processing devices at a third server to:

receive, from the first server, a first tally associated with the client, the first tally comprising identification information of the client and a first number of access requests sent from the client to the first server;

receive, from the second server, a second tally associated with the client, the second tally comprising the identification information of the client and a second number of access requests sent from the client to the second server;

collate, in a database, the first and second tallies based on the identification information of the client associated with the first and second tallies;

calculate, based on the collated first and second tallies, a total number of access requests made by the client over a specified period of time;

assign a dynamic blocking instruction to the identification information of the client if the total number of access requests exceeds a predefined threshold, the dynamic blocking instruction for causing the first and second servers to restrict access of the client to the web site;

record the dynamic blocking instruction in a configuration file;

send the configuration file to the first and second servers, the first and second servers using the dynamic blocking instruction to restrict the access of the client to the web site; and subtract the first number of requests from the total number of access requests if no further tallies associated with the client are received from the first server within an expiration period, the first server sending a tally associated with the client if the client requests access to the first server.

15. The computer program product of claim 14 comprising further instructions that cause the one or more processing devices to:

delete the dynamic blocking instruction from the configuration file if the total number of access requests minus the first number of access requests is below the predefined threshold; and send the configuration file to the first and second servers.

16. A computer program product for restricting access of a client to a web site hosted at a first server and a second server, the first server differing from the second server, the computer program product being tangibly embodied in a non-transitory computer-readable medium, the computer program product comprising instructions that cause one or more processing devices at the first server to:

store a configuration file sent from a third server;

receive an access request from the client;

record, in a log entry, identification information associated with the client and information associated with the access request, wherein the identification information comprises an internet protocol (IP) address;

determine whether the identification information of the client is associated with an instruction recorded in the configuration file by:

comparing the identification information of the client to one or more allow instructions included in the configuration file;

comparing the identification information of the client to one or more dynamic block instructions included in the configuration file; and comparing the identification information of the client to one or more static block instructions included in the configuration file;

if the identification information of the client is associated with an instruction recorded in the configuration file, control access to the first server from the client according to the instruction;

record, in a LFRU (least-frequently-recently used) queue, a first tally associated with the client, the first tally comprising identification information of the client and a number of access requests sent from the client to the first server; and send the first tally to the third server; and subtract the number of access requests sent from the client to the first server from a total number of access requests if no further access requests associated with the client are received from the first server within an expiration period, the first server sending a second tally associated with the client if the client requests access to the first server.

\* \* \* \* \*

UNITED STATES PATENT AND TRADEMARK OFFICE
CERTIFICATE OF CORRECTION

| | | |
|---|---|---|
| PATENT NO. | : 7,716,340 B2 | Page 1 of 1 |
| APPLICATION NO. | : 11/240828 | |
| DATED | : May 11, 2010 | |
| INVENTOR(S) | : Mark Modrall | |

It is certified that error appears in the above-identified patent and that said Letters Patent is hereby corrected as shown below:

Col. 12, Claim 2, line 3, delete "services" and insert --servers--, therefore.

Signed and Sealed this

Twenty-seventh Day of July, 2010

David J. Kappos
*Director of the United States Patent and Trademark Office*